United States Patent [19]

Lehrke

[11] Patent Number: 4,501,952

[45] Date of Patent: Feb. 26, 1985

[54] ELECTRIC FLUID HEATER TEMPERATURE CONTROL SYSTEM PROVIDING PRECISE CONTROL UNDER VARYING CONDITIONS

[75] Inventor: Kenneth E. Lehrke, Maple Grove, Minn.

[73] Assignee: Graco Inc., Minneapolis, Minn.

[21] Appl. No.: 386,017

[22] Filed: Jun. 7, 1982

[51] Int. Cl.³ .................. H05B 1/02; F24H 1/10; B05B 1/24; F28F 1/36

[52] U.S. Cl. .................... 219/305; 165/156; 165/183; 165/184; 219/306; 219/308; 219/331; 219/499; 219/501; 219/505; 222/146.5; 239/135; 338/22 R; 374/185

[58] Field of Search ............. 219/296, 297, 298, 299, 219/303–309, 328, 331, 501, 497–499, 486, 504, 505; 165/156, 181–183, 184; 222/146 HE, 146 H, 146 R; 239/133, 135; 374/185, 183; 338/22 R

[56] References Cited

U.S. PATENT DOCUMENTS

| | | | |
|---|---|---|---|
| 1,188,952 | 6/1916 | Laird | 219/305 |
| 1,549,016 | 8/1925 | McLean | 219/305 |
| 1,965,218 | 7/1934 | Carr | 219/297 X |
| 2,602,877 | 7/1952 | Dawson | 239/133 X |
| 2,686,863 | 8/1954 | Chandler | 219/297 X |
| 2,775,683 | 12/1956 | Kleist | 219/305 X |
| 2,833,909 | 5/1958 | Levey | 219/306 X |
| 2,878,360 | 3/1959 | Tavender et al. | 239/133 |
| 2,987,300 | 6/1961 | Greene | 219/302 X |
| 3,335,655 | 8/1967 | McCuiston | 165/156 X |
| 3,666,973 | 5/1972 | Hulsman | 219/499 X |
| 3,821,516 | 6/1974 | Hayes et al. | 219/499 X |
| 3,898,428 | 8/1975 | Dye | 222/146 HE |
| 3,952,182 | 4/1976 | Flanders | 219/486 X |
| 4,337,388 | 6/1982 | July | 219/308 X |

FOREIGN PATENT DOCUMENTS

| | | | |
|---|---|---|---|
| 263005 | 11/1963 | Australia | 374/185 |
| 2440426 | 3/1976 | Fed. Rep. of Germany | 219/305 |
| 49651 | 4/1980 | Japan | 219/306 |
| 715139 | 9/1954 | United Kingdom | 219/296 |

*Primary Examiner*—A. Bartis

[57] ABSTRACT

A fluid heater, particularly for heating paints, lacquers, varnishes and other spray coating material, includes an elongated hollow tube adapted to be inserted into a fluid flow line for fluid flow through the tube. An electric resistance heater is disposed within the tube and is surrounded by a helical coil member to create a helical fluid flow path through the tube. A temperature control system for regulating the operation of the heater is provided and includes a temperature sensing probe comprising a temperature responsive resistance element enclosed in a conical housing extending into the helical fluid flow path and having its apex contacting the heater and its conical surface area increasing in a direction away from the heater and extending across the cross section of the fluid flow path. The temperature control system is responsive to both the temperature and the rate of change of temperature of the probe and includes an ambient temperature compensation circuit for monitoring the ambient temperature and compensating temperature control circuits for regulating heater temperature as a function of ambient temperature as well as a function of static and dynamic fluid flow conditions in the helical flow path sensed by the probe.

17 Claims, 7 Drawing Figures

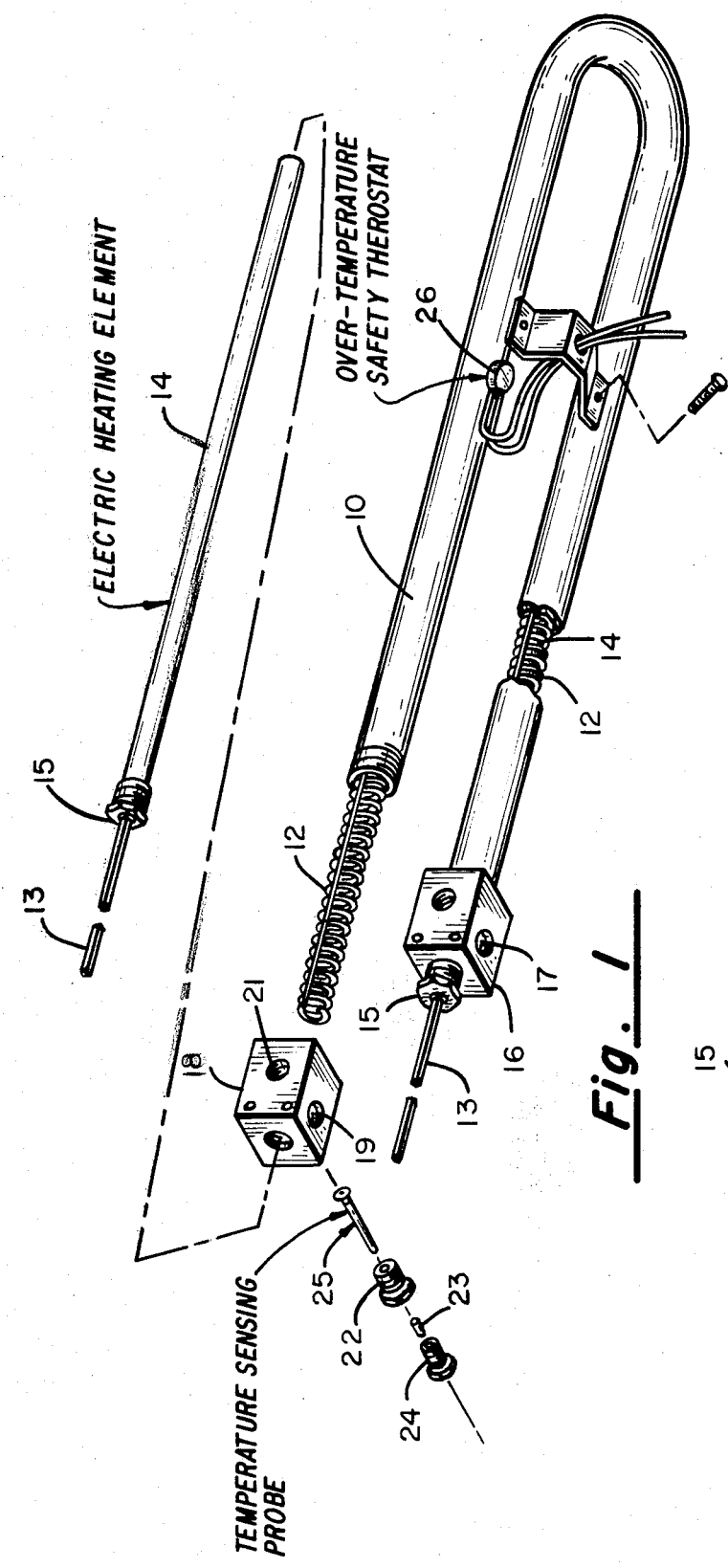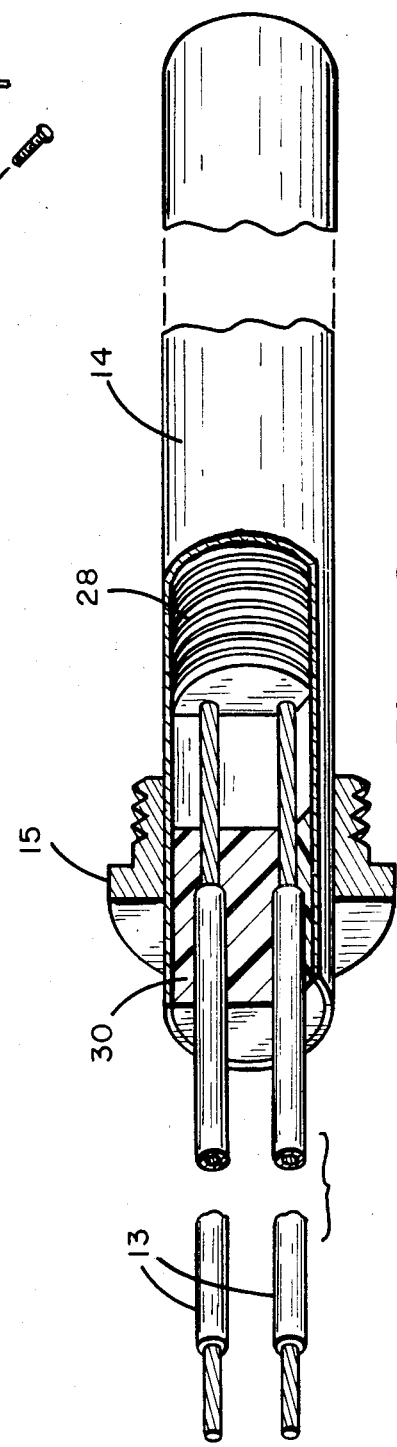

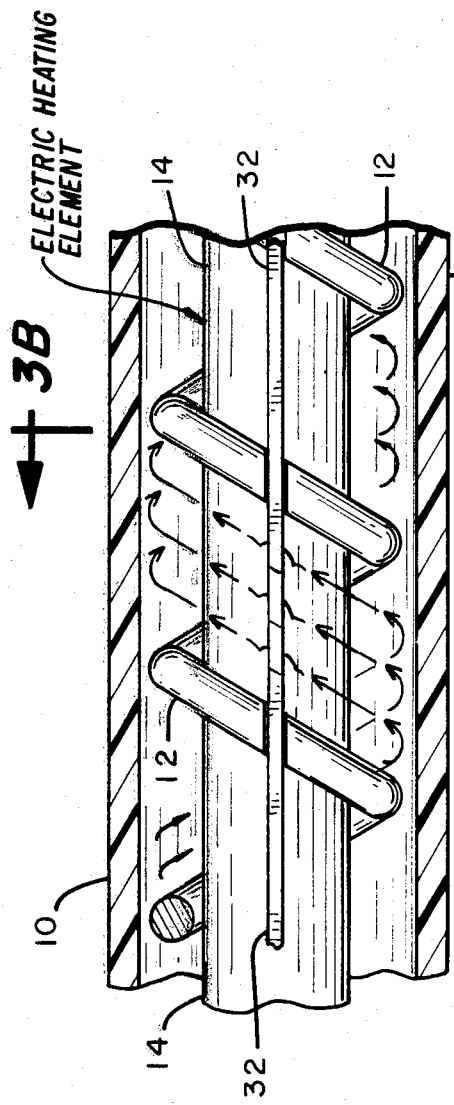
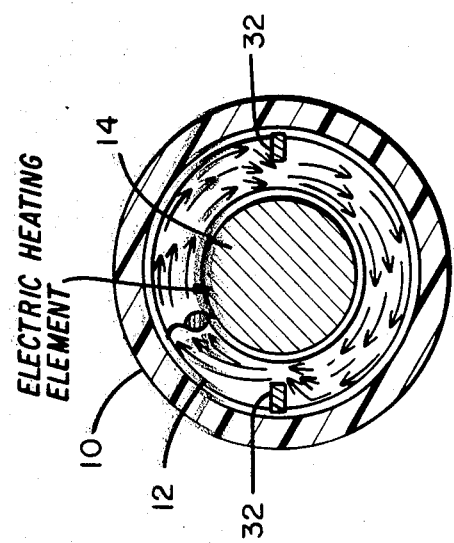
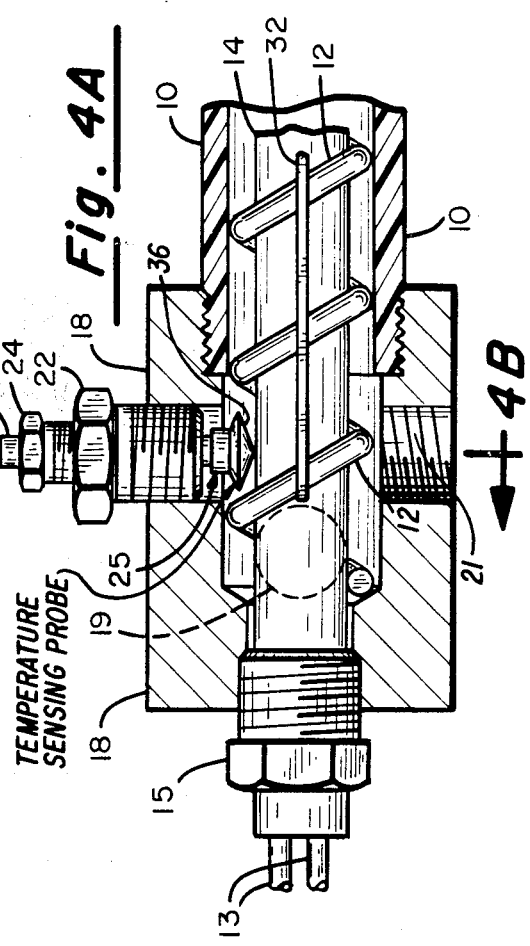
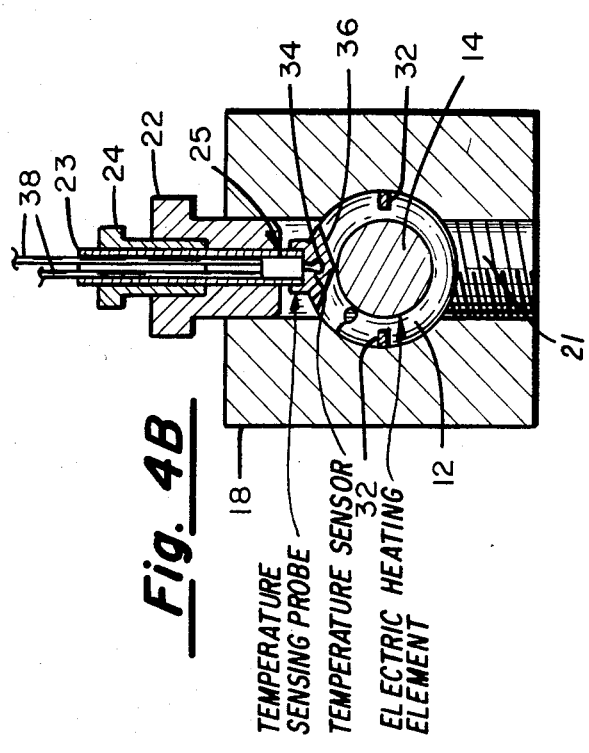

ELECTRIC FLUID HEATER TEMPERATURE CONTROL SYSTEM PROVIDING PRECISE CONTROL UNDER VARYING CONDITIONS

BACKGROUND OF THE INVENTION

The present invention relates to fluid heater apparatus, and more particularly to an improved fluid heater wherein compensation in the heating temperature may be made under both static and dynamic fluid flow conditions, and through monitoring of the ambient temperature in which the apparatus operates. The invention is particularly directed to the heating of paints, lacquers, varnishes, and other single and plural component materials.

In industrial coating operations it is extremely important to control the viscosity of the coating materials, particular when those coating materials are applied by some sort of spraying apparatus wherein it is desirable to create an atomized spray of the coating materials for relatively even application upon a surface to be coated. While there are a number of ways to control fluid viscosity, such as by material and solvent selection, it is particularly convenient to control such viscosity through the control of the temperature of the material. When such materials are applied by means of a spraying apparatus it is important to control the viscosity over fairly narrow ranges. For example, it has been found that viscosity changes exceeding plus or minus eight percent cause a noticeable change in the spray pattern of the fluid as it is being applied, and it has therefore been desirable to control the temperature of the fluid within plus or minus 3° F. The problem is complicated by the fact that spraying devices typically are operated intermittently, resulting in both static and dynamic flow conditions in the fluid being fed into the spray device. Thus a fluid heater must have the capability of precise temperature regulation, so as to decrease the amount of heat applied to the fluid under static conditions, and yet increase the amount of heat applied as soon as the liquid fluid flow conditions become dynamic. Further, it has been found that the ambient temperature of the work place affects the quality of the spray pattern if such ambient temperature varies over significant ranges. Since temperature control in industrial plants is typically poorly regulated, it is not unusual for the work place temperature to vary over as much as 30° F.–40° F. over the time span of a single work shift. When such equipment is used outdoors the problem becomes more severe, because ambient temperature ranges may be even broader.

In the past it has been common practice when relatively constant temperature operating conditions are desired to utilize a high mass fluid heater which may be slowly heated to a desirable temperature, and once heated is relatively insensitive to fluid flow conditions. However, such systems are usually operated at a temperature well above the desired fluid temperature, in order to impart enough heat into the fluid during dynamic flow conditions. This creates an excessive temperature problem under intermittent operating conditions, particularly when the spray device is turned off for a period of time, for then the fluid in the heater will rise to the temperature of the mass being heated. Attempts have been made to compensate for this problem by sensing the fluid temperature rather than the temperature of the mass being heated, and shutting off the heating power to the mass as the fluid temperature reaches the desired level. Similarly, as the fluid temperature drops below the desired level power is applied to heat the mass to return the fluid temperature to the desired level. The problem with this approach lies in the relatively long time it takes to heat and/or cool the large mass through which the fluid passes, resulting in fluid temperature swings both above and below the desired operating range.

It is thus desirable to use a low mass heating element with provision for controlling the temperature of the heating element very rapidly to accommodate fluid flow conditions. Since it is important to obtain a close control over fluid temperature, and since this temperature is affected to a significant degree by ambient temperature, it is also important to sense ambient temperature and use this condition as a further regulation on heating element temperature. Further, it is desirable to utilize a low mass heating element having the capability of controlling evenly the temperature of all of the fluid contained therein or flowing therethrough.

SUMMARY OF THE INVENTION

The present invention utilizes a low mass heating element in close contact with the fluid flow path, the flow path being specially constructed to provide continuous mixing and distribution of the fluid within the heater, and a proportional-control, slope-compensated temperature control circuit monitoring temperature conditions across the flow path cross section within the heater as well as monitoring ambient temperature.

It is therefore a principal object of the present invention to provide a fluid heater having precise and narrow temperature control capabilities under varying static and dynamic fluid flow conditions and ambient temperature conditions.

It is another object of the present invention to provide a fluid heater having the capability to rapidly heat fluid contained therein to a desired operating temperature.

It is further object of the present invention to provide a fluid heater having the capability of reducing the watt density of the heating element under conditions of complete static flow to prevent excessive fluid temperature from developing.

BRIEF DESCRIPTION OF THE DRAWINGS

The foregoing and other objects will become apparent from the following specification and claims, and with reference to the appened drawings, in which:

FIG. 1 shows an exploded view of the invention;

FIG. 2 shows the heating element in partial cross section;

FIG. 3A shows a side cross section view of a portion of the invention;

FIG. 3B shows a view taken along the lines 3B—3B of FIG. 3A;

FIG. 4A shows a cross-sectional view of the invention and a portion thereof;

FIG. 4B shows a view taken along the lines 4B—4B of FIG. 4A; and

DESCRIPTION OF THE PREFERRED EMBODIMENT

Figure 5:
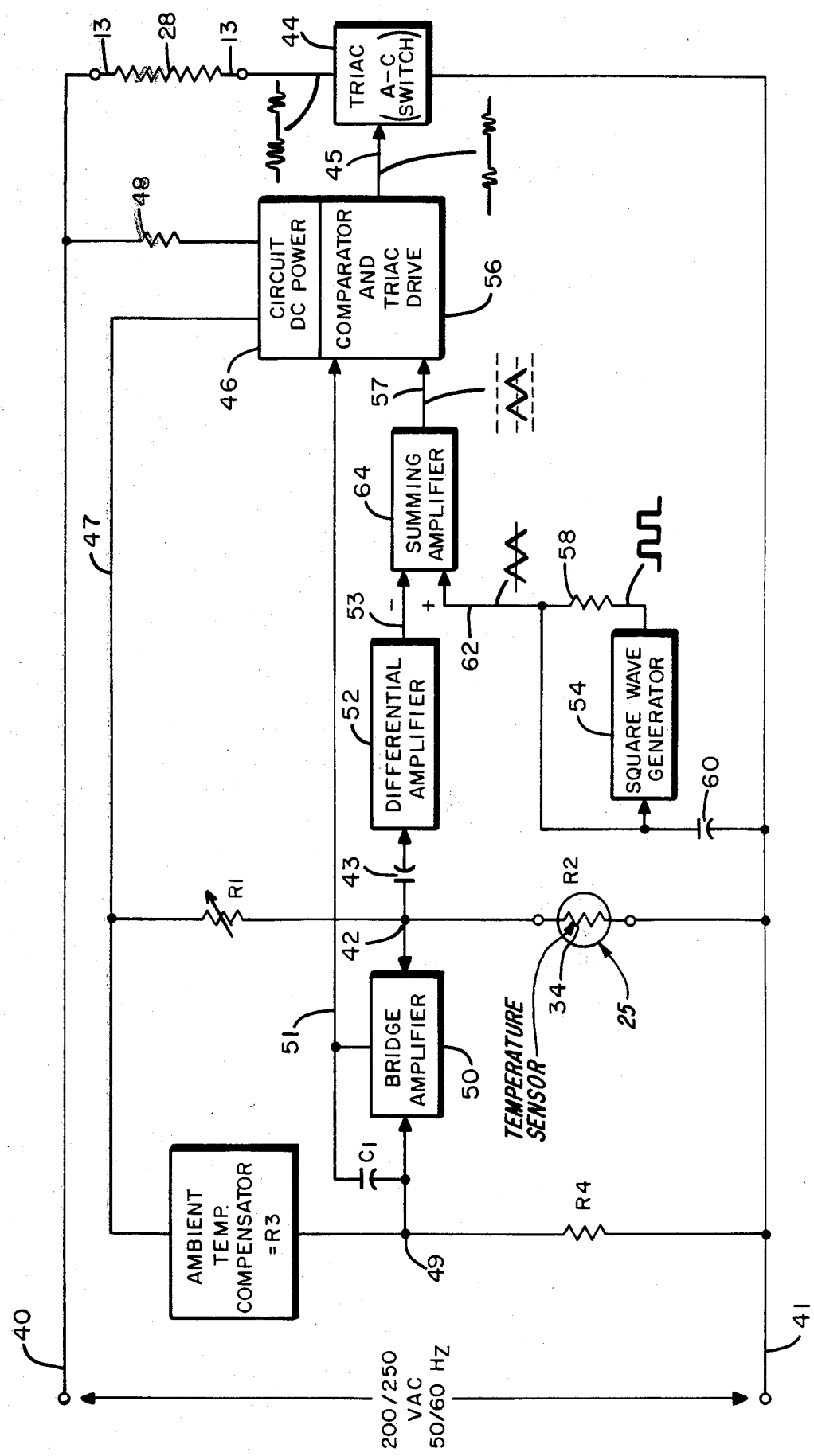
FIG. 5 shows a schematic block diagram of the temperature control circuit of the present invention.

Referring first to FIG. 1 the fluid heater of the present invention is shown in exploded view. A housing 10 consisting of a hollow tube formed in the shape of a "U" serves as the fluid passageway for the invention. A fluid mixer 12 is inserted into each of the legs of the "U" shaped housing, the outer diameter of fluid mixer 12 being sized to relatively snugly fit inside of housing 10. An electric heating element 14 is inserted inside of each of the fluid mixers 12 to a reasonably close diametric fit. Heating element 14 may be a commercially available product, such as Model L323323-5TB5HJO, manufactured by ITT Vulcan Electric Co., Kezar Falls, Maine. In the preferred embodiment heating element 14 is rated at 2550 watts with 240 volts AC applied, and produces a power density of 58 watts per square inch. Each of the open ends of housing 10 is threaded to accept the complementary threads of a fluid manifold. Fluid inlet manifold 16 is threaded to one end of housing 10 and fluid outlet manifold 18 is threaded to the other end of housing 10. Manifold 16 has a threaded inlet port 17 which is adapted for coupling to a fluid hose or other piping arrangement. Manifold 18 has a threaded port 19 which is adapted for similar attachment as an outlet port. In each case heating element 14 is insertable entirely through the respective manifolds, and has a threaded lock and sealing nut 15 for threaded attachment to the respective manifolds. A pair of power wires 13 protrude from sealing nut 15, and may be connected to a suitable source of power for energizing heating element 14. The use of a U-shaped tube enables the concentration of a significant heating power into a relatively small package; if the heating demands of a particular application do not require such heating capabilities other tube shapes could be selected.

Fluid outlet manifold 18 has an additional port 21 which is threaded to accept a sealing nut 22. A temperature sensing probe 25 is coaxially fitted through sealing nut 22, in a manner to be hereinafter described. A seal 23 is fitted into sealing nut 22, and is held in place by cap 24.

A thermostatic switch 26 is attached to the outside of housing 10, and serves to function as an over temperature safety switch. In the preferred embodiment thermostatic switch 26 is selected to provide an open circuit at a temperature of 180° F., and a closed circuit at 200° F.

The fluid heater shown in FIG. 1 may be enclosed within an insulated container of suitable size and shape, and the particular shape of housing 10 may be varied to meet specific design requirements.

FIG. 2 shows heating element 14 in partial cross section. Heating element 14 is a hollow tube having therein a heating wire coil 28 which is electrically connected to wires 13. Wires 13 are fed to the exterior of heating element 14 through an insulation material 30. The outer wall of the tube of heating element 14 is preferably constructed of stainless steel or equivalent material.

FIG. 3A shows a portion of the fluid heater in cross-sectional view. Fluid mixer 12 is a helical member, having diametrically opposed, axially extending baffles 32 affixed thereto. Baffles 32 project inwardly from the outer diameter of fluid mixer 12, and serve to direct the fluid flow path through the device. The fluid flow path is shown by the arrows in FIGS. 3A and 3B, and is shown to be generally helically following fluid mixer 12, except where baffles 32 are encountered, wherein the flow path is forced inwardly toward the center of the helix. Fluid mixer 12 may be constructed from a metallic spring, having baffle members 32 attached thereto.

From this cross-sectional view, it is apparent that the fluid flow path through housing 10 is generally circular, with fluid flow forces directed radially inward at the point of baffles 32. This flow pattern produces continuous mixing of the fluid through housing 10, and close contact between the fluid and heating element 14.

FIG. 4A shows a cross section of the invention through outlet manifold 18. Manifold 18 is threaded onto the end of housing 10 so as to provide a fluid tight seal. Similarly, sealing nut 15 is threadably attached to manifold 18 for providing a fluid tight seal for the attachment of heating element 14. Temperature probe 25 is also sealably attached in manifold 18 by sealing nut 22, reference being made to FIGS. 4A and 4B for the pertinent construction. Temperature probe 25 comprises a thermistor 34 embedded in a thermistor housing 36, the thermistor having connected thereto a pair of wires 38. Temperature sensing probe 25 passes through a seal 23 which is sealably attached by cap 24 to sealing nut 22. Sealing nut 22 is threadably attached to manifold 18. Thermistor housing 36 has a conical surface with its pointed end preferably in physical contact with heating element 14. The remaining surface of thermistor housing 36 is exposed to fluid flow within housing 10. Thermistor 34 is a resistance element having a resistance determined by its temperature, and more generally having its resistance determined by the temperature of thermistor housing 36. Since thermistor housing 36 is in direct point contact with heating element 14, the temperature of thermistor housing 36, and therefore thermistor 34, will be directly dependent upon the temperature of heating element 14 during static flow conditions. However, during dynamic flow conditions the relatively large external surface area of thermistor housing 36 becomes primarily affected by the temperature of the fluid flow through housing 10, and therefore the temperature of thermistor 34 is primarily a function of the temperature of the fluid flowing through housing 10 during dynamic conditions. The net operating effect of temperature sensing probe 25 is to cause it to integrate, or average, all of the temperatures present in the fluid flow cross section.

Referring next to FIG. 5, a schematic block diagram of the control circuit of the invention is shown. Alternating current voltage is applied at power lines 40 and 41. This alternating current voltage may typically be 200/250 volts AC, at 50/60 hertz (Hz). AC power line 40 is wired to one of the wires 13 which connects to heating wires 28. For convenience, only a single heating element 28 is shown in the drawing, it being understood that additional heating elements could be connected thereto, either in parallel or series connection. AC power line 41 is connected to triac circuit 44. Triac circuit 44 is an AC power switch, of a type well-known in the art. In the preferred embodiment triac 44 is manufactured by Raytheon Company, under type designation TAG 741. Triac circuit 44 has a control input line 45, the voltage signals appearing on input line 45 causing triac circuit 44 to turn "on" and "off" as a function of these input signals. AC power line 41 also serves as a circuit common or ground connection.

Direct current power to operate the circuit shown on FIG. 5 is obtained through a circuit DC power supply 46, which receives its input power through dropping resistor 48, and a connection to circuit ground (not shown). DC power supply 46 provides a DC voltage on line 47 and other lines not shown, for operation of the circuits to be hereinafter described.

A resistance bridge circuit is formed by resistors $R_1$, $R_2$, $R_3$, and $R_4$, the function of which will now be described. Resistance $R_1$ is a variable resistance which functions to enable a manual setting of a desired setpoint temperature, and may be set by an operator to any predetermined desired temperature. Resistance $R_2$ (thermistor 34) is the temperature-variable resistor found in temperature sensor 25. Its resistance varies inversely with temperature, the resistance decreasing as the sensed temperature increases, and increasing as the sensed temperature decreases. Resistance $R_3$ is a temperature variant resistor whose resistance values vary inversely with temperature, and whose function is to provide an indication of the room or outdoor ambient temperature. Resistance $R_4$ is a fixed value resistance whose function is to provide a resistor balance point for resistance $R_3$. In practice, resistances $R_3$ and $R_4$ are selected so as to be equal in value at a nominal ambient temperature, i.e. about 80° F., so that the leg of the resistance bridge comprising resistors $R_3$ and $R_4$ is balanced at a nominal ambient temperature. Resistances $R_1$ and $R_2$ from the other balanced leg of the resistance bridge circuit. Resistor $R_2$ (thermistor 34) varies inversely with the temperature of the fluid within housing 10, and resistance $R_1$ may be manually set to a value corresponding to a desired temperature setting of the fluid within housing 10. Resistances $R_2$ and $R_3$, in the preferred embodiment, are products manufactured by Victory Engineering Corp., Springfield, N.J., under type designation VECO T45A35.

The voltage at the junction point 42 of resistances $R_1$ and $R_2$ is direct-coupled into bridge amplifier 50, which generates an output signal in response to this voltage. The voltage at the junction point 49 of resistances $R_3$ and $R_4$ is also direct-coupled into bridge amplifier 50 in the same respect. The output signal from bridge amplifier 50 appears on line 51, and is a voltage representative of a signal commanding more or less heat from the heater, i.e., the higher the voltage level on line 51 the longer will be the duty cycle of the AC power driving the heater, and therefore the more heat will be commanded. This signal is fed into comparator and drive circuit 56 as one of two inputs received by that circuit. The second input into circuit 56 is a signal on line 57, which is a sawtooth voltage riding a DC voltage level. A 60 Hz output signal from circuit 56 will appear on line 45 at any time when the input signal on line 57 is at a lower voltage than the input signal on line 51. The signal on line 45 is used as a control signal input to triac circuit 44, effectively turning on triac circuit 44 to enable AC power to pass through heating wires 28. FIG. 5 shows several voltage waveforms which may be found at the points indicated on the drawing.

A square wave generator 54 generates a repetitive signal having a period of approximately 1½ seconds. This square wave signal is passed through resistance/capacitance network comprising resistor 58 and capacitor 60. This network produces a sawtooth waveform appearing on line 62 as an input to summing amplifier 64. The sawtooth waveform on line 62 is referenced at a potential of 4 volts having equal portions (±1½ volts) of voltage swings about that voltage. A differential amplifier 52 has an input coupled to junction point 42 via a capacitor 43. Differential amplifier 52 reacts to changes in voltage at junction point 42, and the output of differential amplifier 52 is a signal on line 53 which is a DC voltage representative of the rate of change of voltage at point 42. The signal on line 53 is summed with the signal on line 62 by summing amplifier 64, and the output of summing amplifier 64 is therefore a sawtoothed voltage riding a DC level as has been hereinbefore described. It should be noted that the signal received by summing amplifier 64 from line 53 is received at an inverting (−) input terminal, whereas the signal received by summing amplifier 64 from line 62 is received at a noninverting (+) input terminal.

The components selected for the control circuit illustrated on FIG. 5 are all standard commercial components which are commonly available. For example, the power supply, comparator, and drive circuits 46 and 56 are in a single integrated circuit manufactured by RCA, under Type CA3058. The components making up bridge amplifier 50, differential amplifier 52, summing amplifier 64, and square wave generator 54 are all found in a single integrated circuit manufactured by National Semiconductor Company, as Type LM124. In the preferred embodiment resistor 58 has been selected to have a value of 150 kilohms (150K), and capacitor 60 has been selected to have a value of 10 microfarads (uf). Similarly, capacitor 43 has a value of 11 uf, capacitor $C_1$ has a value of 50 uf, and resistor $R_4$ has a value of 47K. Resistor $R_1$ is a variable potentiometer having a nominal range of values from 0 to 45K.

In operation, resistor $R_1$ is nominally set by the operator to a setting representative of the desired fluid temperature. AC power is then applied to the circuit, and the heater begins operating. If the fluid temperature is initially lower than the temperature setting of $R_1$, a positive voltage will be present at point 42, which will be amplified by bridge amplifier 50 resulting in a positive voltage on line 51. Since the positive voltage on line 42 is initially unchanging, the output of differential amplifier 52 is initially zero, and the output of summing amplifier 64 is therefore a sawtooth waveform riding about a 4 volt level. To the extent the voltage on line 57 is lower than the voltage on line 51, circuit 56 will generate a 60 Hz output signal on line 45. The signal on line 45 will trigger triac circuit 44 to cause AC power to pass through heater wires 28. Initially, it may be presumed that the signal on line 57 is lower than the voltage on line 51 during almost the entire sawtooth period, resulting in a 60 Hz continuous output signal from circuit 56, and therefore resulting in a triggering of triac circuit 44 and applying AC power to heater wires 28. This causes the heating temperature to rapidly develop in the fluid heater, and brings about an increase in temperature sensed by resistance $R_2$. Thererfore, the voltage at point 42 begins dropping at a rate consistent with the rise in temperature. Bridge amplifier 50 develops an output signal on line 51 which follows the change of voltage at point 42, but capacitor $C_1$ shunts any rapidly changing voltage, effectively desensitizing bridge amplifier 50 during times when the rate of change of temperature is rapid. Conversely, the rate of change of voltage at point 42 is sensed by differential amplifier 52 to generate a negative voltage on its output line 53. The voltage on line 53 is summed with the sawtoothed waveform on line 62 to generate a less negative-riding sawtoothed voltage on line 57. As the temperature within the fluid heater reaches the nominal setpoint temperature, the voltage at point 42 becomes more negative and the output from bridge amplifier 50 becomes more negative. This results in the signal on line 51 dropping in magnitude and thereby decreasing the drive signal from circuit 56. This decreased drive signal results in a lowered duty cycle operation of triac 44, and gradually lowers the amount of AC power fed into heater coils 28. As the amount of AC power applied to heater coils 28 diminishes the rate of change of increase of heat sensed by resistor $R_2$ diminishes and differential amplifier 52 generates a less negative output signal, tracking this rate of change. This causes the output signal on line 53 to decrease towards zero, and summing amplifier 64 produces an output on line 57 which is a sawtooth voltage riding a DC level approaching the 4 volt bias line. This effectively removes differential amplifier 52 from the circuit and causes summing amplifier 64 to pass a sawtooth voltage to comparator and triac drive circuit 56. At the nominal temperature setpoint the rate of change of voltage at point 42 becomes zero or near zero, differential amplifier 52 generates a zero or near zero output signal on line 53, and summing amplifier 64 generates a sawtoothed waveform on line 57 which is referenced about the bias voltage reference. This is compared with the signal on line 51, resulting in approximately a 50 percent duty cycle operation of triac switch 44.

When temperatures within the heater are at or near the nominal setpoint temperature the voltage on line 51 tracks these minor disparities, increasing or decreasing slightly the duty cycle of triac switch 44 to increase or decrease AC power applied to heater wires 28 by the small additional amount needed to compensate for the temperature disparity. Under these conditions bridge amplifier 50 functions as a high gain amplifier, and small voltage changes at junction 42 produce significant corrective voltages at line 52. When wide disparities exist between the temperature setpoint and the actual temperature the circuit permits rapid heater buildup by tracking the rate of change of actual temperature versus setpoint temperature, thereby permitting the heater to develop full power until actual temperature approaches nominal temperature settings. The output from bridge amplifier 50 is effectively desensitized by capacitor $C_1$, causing it to react with high sensitivity toward slowly varying temperature disparities, and with lower sensitivity towards rapidly varying temperature disparities. Conversely, the output from differential amplifier 52 causes it to react only toward rapidly varying temperature disparities, to control the triac switch 44 duty cycle when such temperature disparities exist.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An electrically operated fluid heater and control circuit comprising
    (a) an elongated hollow tube adapted for insertion into a fluid flow line;
    (b) an electrically operated heater in said hollow tube;
    (c) a helical coil arranged about said heater in said hollow tube, said coil creating a helical fluid flow path in said hollow tube and around said heater;
    (d) temperature sensing means for detecting the temperature of fluid in said tube, said sensing means comprising a conical housing having its apex contacting said heater and a conical surface area increasing in a direction away from said heater but in said fluid flow path, and a temperature responsive resistance element in said housing, and electrical conductors connected to said resistance element and projecting external said housing; and
    (e) temperature control circuit means connected to said electrical conductors and to said electrically operated heater, for controlling said electrically operated heater in response to the temperature of the fluid flowing through said flow path as sensed by said resistance element.

2. The apparatus of claim 1, wherein said temperature control circuit means further comprises means for controlling said electrically operated heater in response to the resistance of said resistance element and in response to the rate of change of resistance of said resistance element.

3. The apparatus of claim 1, wherein said helical coil further comprises at least one baffle longitudinally arranged along said coil and in flow disturbing relation to said fluid flow path.

4. The apparatus of claim 1, wherein said elongated hollow tube has a fluid flow inlet and fluid flow outlet, and further comprising a manifold attached to said fluid flow outlet, said manifold having means for insertion of said electrically operated heater therethrough into said tube and said manifold containing said temperature sensing means.

5. The apparatus of claim 1, further comprising ambient temperature sensing means for detecting temperature outside said tube, and said temperature control circuit means further including means for controlling said electrically operated heater in response to said ambient temperature sensing means.

6. The apparatus of claim 5, wherein said temperature control circuit means comprises means for controlling said electrically operated heater in response to the temperature of said temperature sensing means and in response to the rate of change of temperature of said temperature sensing means and in response to the temperature of said ambient temperature sensing means.

7. The apparatus of claim 6, wherein said helical coil further comprises at least one baffle longitudinally arranged along said coil and in flow disturbing relation to said fluid flow path.

8. The apparatus of claim 1, wherein said elongated hollow tube further comprises a generally U-shaped tube, and said electrically operated heater further comprises first and second heater elements in respective legs of said U-shaped tube.

9. The apparatus of claim 8, further comprising ambient temperature sensing means for detecting temperature outside said tube, and said temperature control means further including means for controlling said electrically operated heater in response to said ambient temperature sensing means.

10. The apparatus of claim 9, wherein said temperature control circuit means comprises means for controlling said electrically operated heater in response to the temperature of said temperature sensing means and in response to the rate of change of temperature of said temperature sensing means and in response to the temperature of said ambient temperature sensing means.

11. The apparatus of claim 10, wherein said helical coil further comprises at least one baffle longitudinally arranged along said coil and in flow disturbing relation to said fluid flow path.

12. A fluid heater adapted for insertion into a fluid flow path and for connection to a source of electrical power, comprising
   (a) a generally U-shaped hollow tube having first and second legs;
   (b) first and second helical coils respectively inserted into said first and second legs, said coils having outer dimensions for close fitting in said legs;
   (c) first and second electrical heater elements respectively inserted through said first and second helical coils, a helical fluid flow path thereby being created through said legs of said hollow tube, about said heater elements, said heater elements respectively having wires coupled thereto and extending outside said tube legs;
   (d) a fluid manifold attached to one of said tube legs, said manifold having a first port adapted for fluid flow coupling to said tube and having a second port adapted for coupling to a fluid flow path and having means for sealably passing said wires external said manifold; and
   (e) first temperature sensing means in said manifold for detecting the temperature of fluid flowing between said first and second port comprising a housing sealably connected into said manifold, said housing having a conical tip with the apex of said conical tip contacting a heater element and the surface of said conical tip disposed in said helical fluid flow path, and a temperature responsive element in said housing proximate said conical tip.

13. The apparatus of claim 12 further comprising second temperature sensing means outside said manifold for detecting the temperature outside said fluid heater.

14. The apparatus of claim 13, further comprising at least one baffle member longitudinally attached to each of said helical coils.

15. The apparatus of claim 13, further comprising temperature control circuit means connected to said first temperature sensing means, said second temperature sensing means, and to said first and second heater elements, for controlling the electrical power applied to said heater elements in response to said first temperature sensing means and said second temperature sensing means.

16. The apparatus of claim 15, wherein said temperature control circuit means further comprises means for controlling said electrically operated heater in response to the temperature of said first and second temperature sensing means and in response to the rate of change of temperature of said first temperature sensing means.

17. The apparatus of claim 16, further comprising at least one baffle member longitudinally attached to each of said helical coils.

* * * * *